June 29, 1954 R. A. NEAVERSON 2,682,345
LOAD HOISTING AND STORAGE MECHANISM
Filed Jan. 24, 1951 2 Sheets-Sheet 1

Inventor
Rowland Alec Neaverson
By

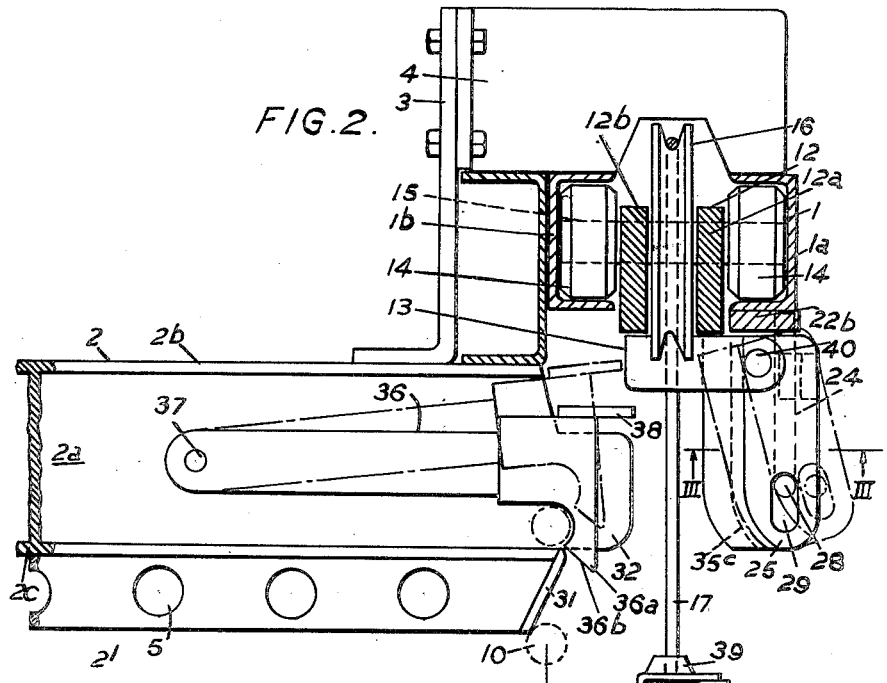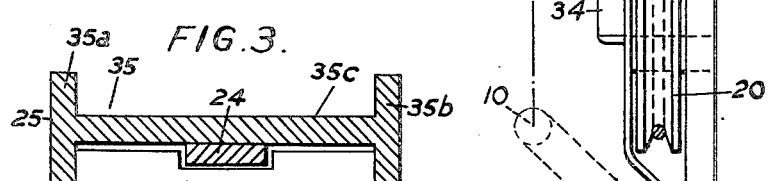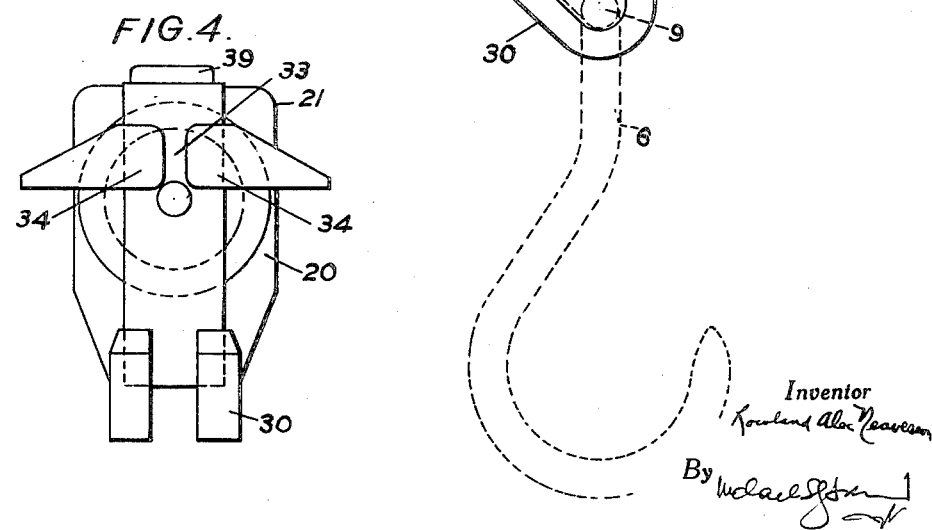

Patented June 29, 1954

2,682,345

UNITED STATES PATENT OFFICE 2,682,345

LOAD HOISTING AND STORAGE MECHANISM

Rowland Alec Neaverson, Leicester, England

Application January 24, 1951, Serial No. 207,481

Claims priority, application Great Britain January 31, 1950

8 Claims. (Cl. 214—16)

This invention comprises a load hoisting and supporting apparatus and is applicable to storage premises or other stationary structures and also to transportable containers, especially containers that are transportable on wheels, for example, containers forming the bodies of road or rail vehicles. A particular object of the invention is to effect such improvements in those road vehicles which are employed for the transport of meat carcases, as will facilitate their loading or unloading.

The invention provides a load hoisting and supporting apparatus, comprising a substantially horizontal transverse runway, a plurality of substantially-horizontal load-carrying runways extending side by side in spaced relation (and preferably in parallel relation) from the transverse runway at least at one side of the latter, each of which load-carrying runways is equipped with, or is arranged removably to receive at a loading end presented to the transverse runway, a plurality of load suspension devices which are movable along it, and hoisting mechanism of the pulley and cable or equivalent type (e. g. chain and pulley) for lifting the loads to the load-carrying runways which mechanism is adjustable along the transverse runway into operative association with the end of any selected load-carrying runway. It will thus be appreciated that after the hoisting mechanism has been brought into association with the loading end of a selected load-carrying runway, this mechanism may be operated to raise a load to a suspension device already on that runway or to raise a suspension device already engaged with the load to such a height that the device may be attached to and move along the runway. Thus a plurality of loads may be suspended from each runway in turn and it will readily be seen that the apparatus is of particular utility in a road vehicle constructed and arranged for use as a meat transporter. It will also be appreciated that the invention is applicable to storage premises such for example as cold storage premises and other stationary structures.

Desirably the hoisting mechanism has a lifting member (e. g. a pulley block with a hook or the like) which rises on operation of the said mechanism and is arranged to have releasable engagement with each of the suspension devices for the purpose of lifting the latter, and the arrangement is such that when the lifting member with an attached device has been raised to the loading end of a load-carrying runway the device is transferable from the lifting member to the runway. In order to facilitate unloading operations, there may be releasable gate mechanism associated with a loading end of each load-carrying runway normally preventing the removal of the suspension devices from said end, and release means operable by the elevation of the lifting member to said loading end to release this mechanism, the arrangement being such that the suspension device may then be transferred from the loading end to the lifting member. The gate mechanism may be arranged automatically to assume its preventive condition subsequent to the transfer of a suspension device from the loading member on to the loading end.

The foregoing and other features of the invention defined in the appended claims are incorporated in the apparatus which will now be described, as an example are particularly suitable for use in a meat transporter, with reference to the accompanying drawings in which:

Figure 2 is a sectional elevation thereof on a larger scale, showing the loading end of one of the load-carrying runways;

Figure 3 is a section taken on the lines III—III in Fig. 2, but on a larger scale;

Figure 4 is an elevation of the lifting member;

Figures 5 and 6 are respectively front and side elevations of one form of suspension device or meat hook, while

Figure 1:
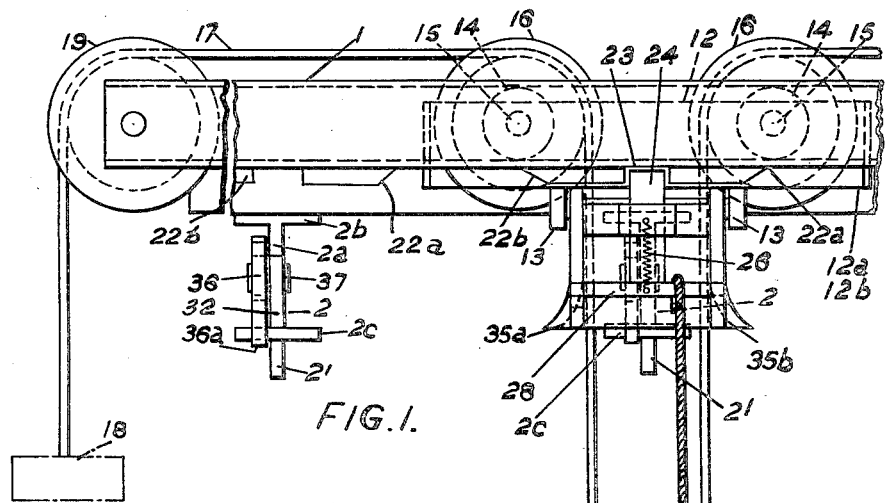
Figure 1 is an end elevation of the apparatus showing two representative load-carrying runways and the transverse runway.

The apparatus comprises in the main a substantially horizontal transverse runway 1, and a plurality of substantially horizontal load-carrying runways 2, extending in parallel relation at least at one side of the transverse runway and so disposed as to present loading ends (shown in Fig. 2) adjacent to it. The transverse runway 1 consists of two channel-section metal girders 1a, 1b (e. g. of aluminium or light alloy) disposed with their channels facing inwards, these girders being connected to one another and to brackets 3 (or a further transverse girder 3) by means 4. The brackets 3 are (or the girder 3 is) attached to the load-carrying runways 2.

Each load-carrying runway 2 consists of an I-section metal joist (e. g. of aluminium or light alloy), said joist having a vertical web 2a and upper and lower flanges 2b, 2c. Beneath the joist there is attached in a suitable manner a depending web 2' pierced with holes 5 for a purpose hereinafter mentioned.

Figure 5:
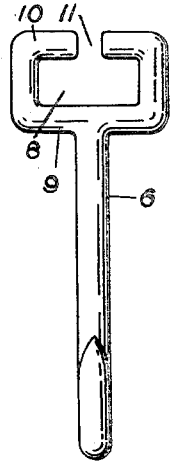
Figure 6:
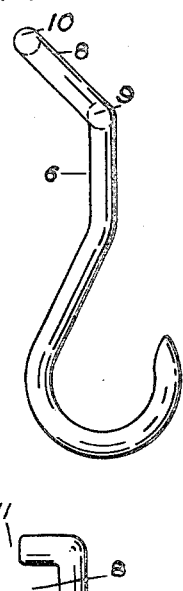
Figure 7:
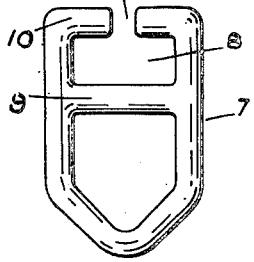
Figure 7 is a front elevation of a further form of suspension device.

The joists 2 are arranged to receive suspension devices such as the meat hook 6 shown in Figures 5 and 6 or the device 7 shown in Fig. 7. Each of these devices has at its top end an open eye 8, with a lower cross bar 9 and an upper cross bar 10 interrupted by a gap 11. Thus the eye may be slid on to the lower end of the joist 2 with the web 2a accommodated within the gap 11 and the parts 10 resting on the upper surface of the bottom flange 2c.

Movable along the transverse runway 1, there is a trolley 12 consisting of side members 12a, 12b, connected together in spaced relation by cross members 13. The trolley is mounted by means of two pairs of rollers 14 that run in the channels of the girders 1a, 1b, and on the spindles 15 of the rollers two pulleys 16 are mounted between the side members 12a, 12b. This trolley forms part of the hoisting mechanism. The cable 17 extends, from winding gear (having a stationary location and indicated at 18), over a pulley 19 at one end of the runway 1, along the runway to one pulley 16, down and around pulley 20 of pulley block 21 constituting the lifting member before mentioned, up around the second pulley 16, and then along the runway to an anchorage at the other end thereof. The winding gear 18 may be hand or power operated.

It will thus be appreciated that the trolley 12 may be shifted along the runway 1 into association with the loading end of the load-carrying joists 2 without upward or downward movement of the pulley block 21, and that in any position of the trolley the pulley block 21 may be raised or lowered by operation of the winding gear 18 without the trolley being shifted. Preferably however there is releasable detent mechanism for locating the hoisting mechanism in operative association with the loading end of any selected one of the joists 2. This detent mechanism consists of spaced cams 22a, 22b formed on the girder 1b opposite the end of each joist 2, there being a gap 23 between these two cams to receive the top end of a bolt 24 which is slidably mounted on a block 25 (pivoted on the trolley 12 at 40) and is urged upwards by a spring 26. Thus as the trolley is shifted along the runway 1 the bolt 24 will engage in the first gap 23 that it meets unless it is otherwise prevented. It may be released from this gap or prevented from entering it by a pull inserted on a cord or the like 27 attached to a cross bar 28 on the lower end of the bolt, this cross bar sliding in slots 29 on the block 25.

The suspension device 6 or 7 is arranged to be engaged with the pulley block 21 by virtue of a claw 30 (which is forked if hooks of the type shown in Fig. 5 are to be employed) which hooks under the lower or lifting cross bar 9. The suspension device is thus pendulously supported by the lifting member 21, and the eye 8 being disposed as shown in Figures 2 and 6, the cross bar 10 travels up beneath the loading end of the appropriate joist 2. Moreover a deflector is provided for rocking the suspension device about the pivot afforded by the bar 9 in such manner that during the latter stages of the upward movement the cross bar 10 is deflected to such a position that the pendulous weight of the suspension device causes the cross bar to swing over the flange 2c. This deflecting device consists of ramp 31 on the loading end of the joist 2 which is arranged to act against cross bar 10 as will readily be appreciated from Fig. 2.

It is of course desirable that the lifting member or block 21 shall be properly located with respect of the loading end of that joist 2 to which a suspension device is to be transferred (or from which a suspension device is to be transferred as hereinafter described). For this purpose at the loading end of each joist 2 the web 2a is formed with a protruding part constituting a key 32 to be entered in a slot 33 between lugs 34 on the face of block 21.

In addition, one face of the block 25 is provided with a channel 35 as best shown in Fig. 3 into which the block 21 moves, the said block 21 being a sliding fit in the channel. The lower parts of the side walls 35a, 35b of this channel are flared outwards as shown in Fig. 1, and the face of its rear wall is flared away from the loading end of the joist 2 as indicated by the broken lines 35c in Fig. 2. As lifting block 21 passes up into channel 35, block 25 is swung about its pivot 40 as illustrated in Fig. 2. In this movement the block 25 may lock onto the joist 1a so as to prevent movement of carriage 12 along runway 1. For example, block 25 may press against cams 22a, 22b, or its position may be such that the bolt 24 cannot be drawn sufficiently to become free of gap 23.

In order to prevent accidental discharge or improper unloading of the suspension devices 6 or 7 releasable gate mechanism is associated with the loading end of each load-carrying runway 2. This gate mechanism normally prevents removal or discharge of a suspension device but release means is provided which is operated by the elevation of the lifting block 21 to an unloading position and the arrangement is such that upon this release a suspension device may be then transferred from the loading end to the lifting block 21.

This gate mechanism consists of a latch 36 pivoted at 37 on the web 2a of the joist 2, and having its extremity 36a formed with an incline 36b which is engaged and lifted by the bar 10 of the suspension device. Immediately the bar 10 is passed on to the flange 2c the end 36a of the latch falls down behind it.

However when it is desired to transfer a suspension device from the loading end of a runway 2 onto the lifting block 21, the latter is raised to an unloading position which is somewhat higher than the loading position. In movement to this unloading position the lugs 34 engage a plate 38 on the end of the latch 36 and raise the latter to release position. Simultaneously a key 39 on the top of the block 21 engages between the side members 12a, 12b of the carriage 12, so that the block is positioned.

At this stage the top of the hook 30 is level with the top of the bottom flange 2c of the runway 2, so that the top bar 10 of the suspension device may readily be moved from the runway in the hook, the said hook passing into the eye 8.

Attention is directed to the fact that in loading the suspension device is lifted by the engagement of the hook 30 of the lifting member 21 with the bar 9, while in unloading the suspension device is lowered by engagement of the hook 30 with the bar 10.

It will be appreciated that the apparatus described permits a number of loaded suspension devices such as 6 or 7 to be raised one after another to the end of any of the load-carrying runways 2 and loaded on to that runway, each suspension device being then shifted along the runway to make room for the next.

Moreover the loaded suspension devices may be unloaded from the runway with equal facility.

The holes 5 in the member 2' permit the hooks or other suspension devices such as 6 or 7 (and conveniently carrying smaller loads than those suspension devices that are supported on the adjacent flange 2c) to be hooked into them.

The hoisting mechanism may be of any suitable type and may, for example, comprise a trolley travelling along the runway 1 and carrying a hand operated chain-and-sprocket or rope-and-pulley tackle of the type in which lifting is effected by the operator pulling on a bight of an endless chain or rope as for example in Weston block mechanism.

The apparatus is particularly applicable to transportable containers in which case the joists 2 will be located in the interior of the container body immediately under the roof to extend from the front to rear and the runway 1 extends past the rear end of these joists adjacent to the rear doors of the vehicle body. It may overhang the rear of the floor of the vehicle body for ease in loading, or that part of the floor which is located immediately below the track of the trolley 12 may be hinged to swing downwards.

The floor of the vehicle immediately below the transverse runway 1 may be formed with one or more steps so that a person, carrying a load to be hung on one of the webs 2', may readily ascend from ground level. Alternatively or in addition the tail board of the vehicle may be arranged, when let down, to form a step. For example, the tail board may be substantially L-shaped in section, the hinge axis being substantially coincident with the edge of the horizontal arm of the L so that when the board is swung down through 90° (and there supported by suitable stays or other means) the originally-vertical part of the L forms a step tread and said arm forms a riser, located substantially in the plane of the transverse runway. In such a construction, when the tail board is up in its normal position, there is a well or cavity between it and the floor of the vehicle. Such a well or cavity may be undesirable when loading from or unloading onto a deck or platform, and so a detachable floor panel is provided to cover it (the top edge of the tail board being, if desired, substantially level with this panel and the remainder of the floor).

I claim:

1. A load-hoisting and storage mechanism comprising a plurality of side-by-side storage runways each with a central web and lower transverse flanges, a transfer runway disposed across one end of said storage runways, a load-lifter transportable along said transfer runway to positions opposite the respective storage runways, and a plurality of hook-like load-engaging elements each having at its upper end means to be engaged detachably by said lifter, and means to slide freely on the flanges on any of said storage runways.

2. A load-hoisting and storage mechanism comprising a plurality of side-by-side storage runways each with a central web and lower transverse flanges, a transfer runway disposed across one end of said storage runways, a load-lifting and lowering mechanism transportable along said transfer runway to positions opposite the respective storage runways and having a rising and falling load lifter, releasable latching means for locating the said mechanism selectively in any one of said positions, abutment means holding the raised lifter to the selected storage runway, and a plurality of suspension devices each shaped at a lower part to engage a load and each having at an upper part means to be engaged and raised by the lifter for loading on to a runway and means both to slide freely on the flanges of a storage runway and to engage and be lowered by the lifter for unloading from a runway.

3. In a load-hoisting and storage mechanism having a plurality of side-by-side storage runways each with a central web and lower horizontal flanges, and a transfer runway across one end thereof carrying a transportable lifting and lowering device, a plurality of load-engaging elements each having at an upper part a continuous cross bar to be engaged and raised by said device, and at a still upper part an interrupted cross bar both to slide on said flanges of a storage runway with the central web between them and to be caught and lowered by said device when leaving the storage runway.

4. A load-hoisting and storage mechanism according to claim 1, wherein each storage runway has a retaining latch adjacent the transfer runway, wherein each said load-carrying element has a part to engage and raise said latch when at one point in the upward movement of the lifter whilst being lifted thereby, permitting its entry on to the storage runway, and wherein the lifter has an abutment to engage and raise the latch at a higher point in its upward movement, whilst not carrying such an element, to permit the passage of a load-carrying element from the storage runway to the lifter.

5. A load-hoisting and storage mechanism, comprising a plurality of side-by-side storage runways each having a central vertical web and horizontal flanges at the bottom of such web, a transfer runway positioned at a higher level than and across the forward end of said storage runways, a ramp below the flanges of each storage runway, at the forward end, a retaining latch pivoted to the central web of each storage runway and projecting forwardly of said ramp, a lifting and lowering device transportable along the transfer runway, with means for latching it in position opposite any one storage runway, means on the lifting and lowering device for raising said latch, and a plurality of hook-like load-engaging elements each having a part to ride on said ramp, raise said latch, and to be slid freely on said flanges.

6. A load-hoisting and storage mechanism, comprising a plurality of side-by-side storage runways each having a central vertical web and horizontal flanges at the bottom of such web, a part of the web projecting forwardly of the flanges, a transfer runway positioned at a higher level than and across the forward end of said storage runways, a ramp below the flanges of each storage runway, at the forward end, a retaining latch pivoted to the central web of each storage runway and projecting forwardly of said ramp, a lifting and lowering device transportable along the transfer runway, said device including a rising and falling pulley block, means for latching said device in position opposite any one storage runway, spaced lugs on the pulley block receiving between them the forwardly projecting part of said central web, a flanged abutment depending from the lifting and lowering device and receiving the pulley block between its flanges, said latch on the central web lying in the path of the lugs on the pulley block so as to be raised thereby, and a plurality of hook-like load-engaging elements each having a part to ride on said ramp, raise said latch, and to be slid freely on said flanges.

7. A load-hoisting and storage mechanism according to claim 6, wherein the depending abutment is a pivoted block and carries a sliding bolt to engage between cams on the transfer runway.

8. In a load-hoising and storage mechanism, a plurality of side-by-side storage runways each having a forwardly-projecting retaining latch, a ramp below the forward end of each such runway, a rising and falling pulley block transportable to a position in line with any one of said runways, an open hook formation on said pulley block, and a plurality of load-engaging members each having near its upper part a continuous cross-bar to fit such hook formation, and at its upper part an interrupted cross bar located so as to ride on said ramp and raise said latch, shaped so as to be slid freely onto the runway and be retained by said latch, and adapted to be received by said open-hook formation when discharged from the runway.

References Cited in the file of this patent

UNITED STATES PATENTS

| Number | Name | Date |
| --- | --- | --- |
| 775,627 | Johnston | Nov. 22, 1904 |
| 1,111,100 | Sawyer | Sept. 22, 1914 |
| 1,150,003 | Focardi | Aug. 10, 1915 |
| 1,778,332 | Meyer | Oct. 14, 1930 |
| 1,856,239 | Buckley | May 3, 1932 |
| 2,035,359 | Anjesky | Mar. 24, 1936 |
| 2,159,623 | Schmidt | May 23, 1939 |
| 2,401,942 | Le Fiell | June 11, 1946 |
| 2,451,368 | White et al. | Oct. 12, 1948 |

FOREIGN PATENTS

| Number | Country | Date |
| --- | --- | --- |
| 160,193 | Switzerland | Feb. 28, 1933 |